United States Patent Office 3,101,353
Patented Aug. 20, 1963

3,101,353
2-FORMYL-Δ'-ANDROSTENES AND Δ$^{1,4}$-ANDROSTADIENES
Albert Bowers and John Edwards, Mexico City, Mexico, assignors, by mesne assignments, to Syntex Corporation, a corporation of Panama
No Drawing. Filed July 19, 1961, Ser. No. 125,107
18 Claims. (Cl. 260—397.4)

The present invention relates to novel cyclopentano-phenanthrene compounds and to a process for the production thereof.

More particularly, the present invention relates to novel 2-formyl-Δ$^1$-androsten-17β-ol-3-one derivatives and 19-nor derivatives which may also contain a saturated, or unsaturated hydrocarbon group at 17α and further unsaturation at C-4, 5 as well as to the esters thereof.

The novel compounds of the present invention are represented by the following formulas:

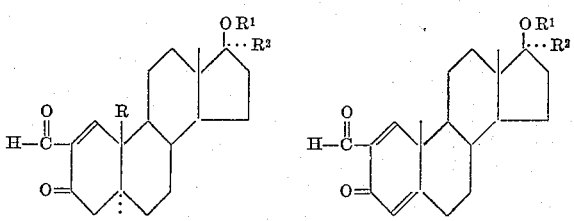

In the above formulas R represents hydrogen or methyl; R$^1$ may be hydrogen or a hydrocarbon carboxylic acyl group of less than 12 carbon atoms; and R$^2$ represents hydrogen, or an alkyl, alkenyl or alkinyl group containing less than 8 carbon atoms.

Typical groups are methyl, ethyl, propyl, ethenyl, butenyl, hexenyl, ethinyl, propinyl and butinyl.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas are powerful anabolic agents with low androgenicity and exhibit anti-estrogenic activity and lower the blood cholesterol level. The compounds represented by the above formulas wherein R$^2$ is alkenyl or alkinyl have also progestational activity.

The compounds of the present invention are prepared by the process illustrated by the following equation:

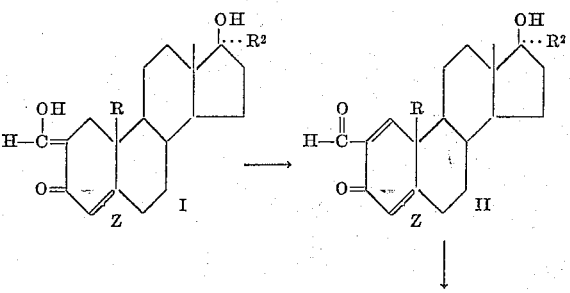

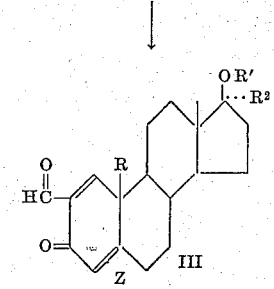

In the above formulas R, R$^1$ and R$^2$ have the same meaning as previously set forth. Z represents a double bond or a saturated linkage between C-4 and C-5. When R=H, Z is a saturated linkage.

In practicing the process outlined above the starting 2-hydroxy-methylen-androstan-17β-ol-3-one derivative (I) obtained as described in Ringold et al., J. Am. Chem. Soc. 81, 427 (1959), is treated with 1.1 molar equivalents of 2,3-dichloro-5,6-dicyano-p-benzoquinone for a period of time of the order of 1–5 minutes, preferably one minute, thus furnishing the corresponding 2-formyl-Δ$^1$-androsten-17β-ol-3-one derivative (II).

In a similar manner, the 2-hydroxymethylene-testosterone derivative (I: Z=double bond) described by Ringold et al., supra, are treated with 2,3-dichloro-5,6-dicyano-p-benzoquinone for a period of time of the order of 1–5 minutes, preferably two minutes, to afford the corresponding 2-formyl-Δ$^{1,4}$-androstadiene derivatives (II: Z=double bond).

The obtained secondary alcohols such as the 17β-ol derivatives are conventionally acylated in pyridine with a suitable acylating agent such as acetic anhydride or propionic anhydride, affording the corresponding 17β-acyloxy derivative (III: R$^2$=H).

The tertiary alcohols such as the 17α-substituted 17β-ol derivatives are conventionally acylated with excess acylating agent such as acetic anhydride, in the presence of p-toluenesulfonic acid to give the corresponding 17β-acyloxy derivative (III: R$^2$=hydrocarbon).

The novel compounds of the present invention may also be prepared by first brominating a 2-hydroxymethylene androstane derivative (I) to form the corresponding 2-bromo-2-formyl derivative which is then dehydrobrominated as by treatment with calcium carbonate or a mixture of lithium bromide and lithium carbonate in dimethylformamide to afford the 2-formyl-Δ$^1$-androstene (III).

The following specific examples serve to illustrate but are not intended to limit the scope of the present invention:

Example I

To a solution of 3 g. of dihydrotestosterone in 60 cc. of anhydrous benzene was added 3 cc. of ethyl formate and 1.3 g. of sodium hydride, suspended in mineral oil while cooling and stirring under an atmosphere of nitrogen. The mixture was stirred for 24 hours at room temperature, hexane was added until complete precipitation, the solid was collected and dried under vacuum. The crude material was suspended in aqueous hydrochloric acid and stirred at room temperature for half an hour. The precipitate was collected, washed with water and dried. Recrystallization from methylene-chloride-hexane gave 2-hydroxymethylene-dihydrotestosterone.

Following the above technique were treated 17α-methyl-dihydrotestosterone, 17α-ethyl-dihydrotestosterone, 17α-vinyl-dihydrotestosterone and 17α-ethinyl-dihydrotestosterone, yielding correspondingly 2-hydroxymethylene-17α-methyl-dihydrotestosterone, 2-hydroxymethylene-17α-ethyl-dihydrotestosterone, 2-hydroxy-methylene-17α-vinyl-dihydrotestosterone and 2-hydroxymethylene-17α-ethinyl-dihydrotestosterone.

*Example II*

19-nor-dihydrotestosterone, 17α-methyl-19-nor-dihydrotestosterone, 17α-ethyl-19-nor-dihydrotestosterone, 17α-vinyl-19-nor-dihydrotestosterone, and 17α-ethinyl 19-nor-dihydrotestosterone were treated by the procedure described in Example I, affording respectively 2-hydroxymethylene-19-nor-dihydrotestosterone, 2-hydroxymethylene-17α-methyl-19-nor-dihydrotestosterone, 2-hydroxymethylene-17α-ethyl-19-nor-dihydrotestosterone, 2-hydroxymethylene-17α-vinyl-19-nor-dihydrotestosterone, 2-hydroxymethylene-17α-ethinyl-19-nor-dihydrotestosterone.

*Example III*

When applying the procedure described in Example I to: testosterone, 17α-methyl-testosterone, 17α-vinyl-testosterone and 17α-ethinyl-testosterone, there were obtained 2-hydroxymethylene-testosterone, 2-hydroxymethylene-17α-methyl-testosterone, 2-hydroxymethylene-17α-vinyl-testosterone, and 2-hydroxymethylene-17α-ethinyl-testosterone.

*Example IV*

To 1 g. of 2-hydroxymethylen-androstan-17β-ol-3-one in 10 cc. of dioxane, was added a solution of 1.1 molar equivalents of 2,3-dichloro-5,6-dicyano-p-benzoquinone in 10 cc. of dioxane. After one minute at room temperature, the resulting mixture was diluted with methylene chloride and filtered through 40 g. of alumina. The filtrate was evaporated to dryness and the residue was recrystallized from acetone-hexane thus affording 2-formyl-Δ¹-androsten-17β-ol-3-one with a melting point of 215–7° C.; [α]$_D$ +23°, λ max 241, log ε=3.9.

When applying the above procedure to 2-hydroxymethylene-17α-methyl-androstan-17β-ol-3-one, and 2-hydroxymethylene-17α-ethyl-androstan-17β-ol-3-one, there were obtained respectively 2-formyl-17α-methyl-Δ¹-androsten-17β-ol-3-one, and 2-formyl-17α-ethyl-Δ¹-androsten-17β-ol-3-one.

*Example V*

2-hydroxymethylene-17α-methyl-Δ⁴-androsten-17β-ol-3-one was treated following the technique described in Example IV furnishing 2-formyl-17α-methyl-Δ¹,⁴-androstadien-17β-ol-3-one with a melting point of 92–6° C.; [α]$_D$ −66.5°, λ max 248 mμ, log ε=4.04.

By the same technique were treated 2-hydroxymethylen-Δ⁴-androsten-17β-ol-3-one and 2-hydroxymethylen-17α-ethyl-Δ⁴-androsten-17β-ol-3-one thus furnishing respectively 2-formyl-Δ¹,⁴-androstadien-17β-ol-3-one, and 2-formyl-17α-ethyl-Δ¹,⁴-androstadien-17β-ol-3-one.

*Example VI*

Following the procedure described in Example IV were treated 2-hydroxymethylene-19-nor-androstan-17β-ol-3-one, 2-hydroxymethylene-17α-methyl-19-nor-androstan-17β-ol-3-one, and 2-hydroxymethylene-17α-ethyl-19-nor-androstan-17β-ol-3-one, thus furnishing respectively 2-formyl-19-nor-Δ¹-androsten-17β-ol-3-one, 2-formyl-17α-methyl-19-nor-Δ¹-androsten-17β-ol-3-one, and 2-formyl-17α-ethyl-19-nor-Δ¹-androsten-17β-ol-3-one.

*Example VII*

A mixture of 2 g. of 2,3-dichloro-5,6-dicyano-1,4-benzoquinone in 40 cc. of dioxane was added to a solution of 2 g. of 2-hydroxy-methylene dihydrotestosterone, in 30 cc. of dioxane at room temperature. After 2 minutes at room temperature the reaction mixture was diluted with 50 cc. of methylene chloride and then filtered to remove the precipitate of dichloro-dicyano-hydroquinone. The filtrate was adsorbed onto 80 g. of alumina. Elution and crystallization of the solid portions from acetone-hexane afforded 2-formyl-Δ¹-androsten-17β-ol-3-one identical with the product obtained in Example IV.

Following the above technique were treated 2-hydroxymethylene-17α-methyl-dihydrotestosterone, 2-hydroxymethylene-17α-vinyl-dihydrotestosterone, 2-hydroxymethylene-17α-ethinyl-dihydrotestosterone yielding correspondingly 2-formyl-17α-methyl-Δ¹-androsten-17β-ol-3-one, 2-formyl-17α-vinyl-Δ¹-androsten-17β-ol-3-one, and 2-formyl-17α-ethinyl-Δ¹-androsten-17β-ol-3-one.

*Example VIII*

2-hydroxymethylene-19-nor-dihydrotestosterone, 2-hydroxymethylene-17α-methyl-19-nor-dihydrotestosterone, 2-hydroxymethylene-17α-ethyl-19-nor-dihydrotestosterone, and 2-hydroxymethylene-17α-vinyl-19-nor-dihydrotestosterone, and 2-hydroxymethylene-17α-ethinyl-19-nor-dihydrotestosterone were treated by the procedure described in Example VII, affording respectively 2-formyl-19-nor-Δ¹-androsten-17β-ol-3-one, 2-formyl-17α-methyl-19-nor-Δ¹-androsten-17β-ol-3-one, 2-formyl-17α-ethyl-19-nor-Δ¹-androsten-17β-ol-3-one, 2-formyl-17α-vinyl-19-nor-Δ¹-androsten-17β-ol-3-one, and 2-formyl-17α-ethinyl-19-nor-Δ¹-androsten-17β-ol-3-one.

*Example IX*

When applying the procedure described in Example VII to 2-hydroxymethylene-testosterone, 2-hydroxymethylene-17α-methyl-testosterone, 2-hydroxymethylene-17α-vinyl-testosterone and 2-hydroxymethylene-17α-ethinyl-testosterone, there were obtained 2-formyl-Δ¹,⁴-androstadien-17β-ol-3-one, 2-formyl-17α-methyl-Δ¹,⁴-androstadien-17β-ol-3-one, 2-formyl-17α-vinyl-Δ¹,⁴-androstadien-17β-ol-3-one and 2-formyl-17α-ethinyl-Δ¹,⁴-androstadien-17β-ol-3-one.

*Example X*

A mixture of 1 g. of 2-formyl-Δ¹-androsten-17β-ol-3-one, 4 cc. of pyridine and 2 cc. of acetic anhydride was kept at room temperature overnight, poured into ice water, the formed precipitate was filtered off, washed with water and dried. Crystallization from acetone-hexane afforded 2-formyl-Δ¹-androsten-17β-ol-3-one-17-acetate.

Following the above technique, there were treated 2-formyl-19-nor-Δ¹-androsten-17β-ol-3-one and 2-formyl-Δ¹,⁴-androstadien-17β-ol-3-one yielding correspondingly 2-formyl-19-nor-Δ¹-androsten-17β-ol-3-one-acetate and 2-formyl-Δ¹,⁴-androstadien-17β-ol-3-one acetate.

*Example XI*

Using the conditions described in Example X except that acetic anhydride was substituted by propionic anhydride, caproic anhydride, cyclopentylpropionic anhydride and benzyl chloride, there were correspondingly produced the propionates, caproates, cyclopentylpropionates and benzoates of the starting compounds set forth in the aforementioned example.

*Example XII*

A mixture of 1 g. of 2-formyl-17α-methyl-Δ¹-androsten-17β-ol-3-one, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolyzed. Isolation of the product by methylene chloride extraction and crystallization of the residue from acetone ether gave 2-formyl-17α-methyl-Δ¹-androsten-17β-ol-3-one-acetate.

Following the above described technique were treated the following starting compounds affording correspondingly the products hereinafter set forth.

| Starting compounds | Products |
| --- | --- |
| 2-formyl-17α-vinyl-Δ¹-androsten-17β-ol-3-one. | 17-acetate of 2-formyl-17α-vinyl-Δ¹-androsten-17β-ol-3-one. |
| 2-formyl-17α-ethinyl-Δ¹-androsten-17β-ol-3-one. | 17-acetate of 2-formyl-17α-ethinyl-Δ¹-androsten-17β-ol-3-one. |
| 2-formyl-17α-methyl-19-nor-androstan-17β-ol-3-one. | 17-acetate of 2-formyl-17α-methyl-19-nor-androstan-17β-ol-3-one. |
| 2-formyl-17α-vinyl-19-nor-androstan-17β-ol-3-one. | 17-acetate of 2-formyl-17α-vinyl-19-nor-androstan-17β-ol-3-one. |
| 2-formyl-17α-ethinyl-19-nor-androstan-17β-ol-3-one. | 17-acetate of 2-formyl-17α-ethinyl-19-nor-androstan-17β-ol-3-one. |
| 2-formyl-17α-methyl-Δ¹,⁴-androstadien-17β-ol-3-one. | 17-acetate of 2-formyl-17α-methyl-Δ¹,⁴-androstadien-17β-ol-3-one. |
| 2-formyl-17α-vinyl-Δ¹,⁴-androstadien-17β-ol-3-one. | 17-acetate of 2-formyl-17α-vinyl-Δ¹,⁴-androstadien-17β-ol-3-one. |
| 2-formyl-17α-ethinyl-Δ¹,⁴-androstadien-17β-ol-3-one. | 17-acetate of 2-formyl-17α-ethinyl-Δ¹,⁴-androstadien-17β-ol-3-one. |

*Example XIII*

Following the same technique described in Example XII, there were treated the starting compounds listed below with the indicated anhydride furnishing the products hereinafter set forth.

| Starting compound | Anhydride | Product |
| --- | --- | --- |
| 2-formyl-17α-methyl-Δ¹-androsten-17β-ol-3-one. | Caproic | 17-caproate of 2-formyl-17α-methyl-Δ¹-androsten-17β-ol-3-one. |
| 2-formyl-17α-ethyl-Δ¹-androsten-17β-ol-3-one. | Propionic | 17-propionate of 17α-ethyl-Δ¹-androsten-17β-ol-3-one. |
| Do | Cyclopentylpropionic. | 17-cyclopentylpropionate of 2-formyl-17α-ethyl-Δ¹-androsten-17β-ol-3-one. |
| 2-formyl-17α-methyl-19-nor-Δ¹-androsten-17β-ol-3-one. | Propionic | 17-propionate of 2-formyl-17α-methyl-19-nor-Δ¹-androsten-17β-ol-3-one. |
| Do | Cyclopentylpropionic. | 17-cyclopentylpropionate of 2-formyl-17α-methyl-Δ¹-androsten-17β-ol-3-one. |
| 2-formyl-17α-ethyl-19-nor-Δ¹-androsten-17β-ol-3-one. | Propionic | 17-propionate of 2-formyl-17α-ethyl-19-nor-Δ¹-androsten-17β-ol-3-one. |
| Do | Caproic | 17-caproate of 2-formyl-17α-ethyl-19-nor-Δ¹-androsten-17β-ol-3-one. |
| 2-formyl-17α-ethyl-Δ¹,⁴-androstadien-17β-ol-3-one. | Acetic | 17-acetate of 2-formyl-17α-ethyl-Δ¹,⁴-androstadien-17β-ol-3-one. |
| Do | Propionic | 17-propionate of 2-formyl-17α-ethyl-Δ¹,⁴-androstadien-17β-ol-3-one. |
| 2-formyl-17α-methyl-Δ¹,⁴-androstadien-17β-ol-3-one. | Caproic | 17-caproate of 2-formyl-17α-methyl-Δ¹,⁴-androstadien-17β-ol-3-one. |
| Do | Cyclopentylpropionic. | 17-cyclopentylpropionate of 2-formyl-17α-methyl-Δ¹,⁴-androstadien-17β-ol-3-one. |

We claim:
1. A compound of the following formula:

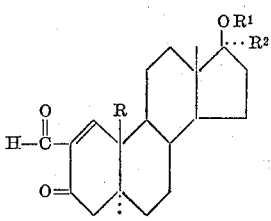

wherein R is selected from the group consisting of hydrogen and methyl; R¹ is selected from the group consisting of hydrogen and a hydrocarbon carboxylic acyl group of less than 12 carbon atoms; and R² is selected from the group consisting of hydrogen, an alkyl, an alkenyl, and an alkinyl group each containing less than 8 carbon atoms.

2. 2-formyl-Δ¹-androsten-17β-ol-3-one.
3. 2-formyl-17α-methyl-Δ¹-androsten-17β-ol-3-one.
4. 2-formyl-17α-ethinyl-Δ¹-androsten-17β-ol-3-one.
5. 2-formyl-19-nor-Δ¹-androsten-17β-ol-3-one.
6. 2-formyl - 17α - methyl-19-nor-Δ¹-androsten-17β-ol-3-one.
7. 2 - formyl - 17α-ethinyl-19-nor-Δ¹-androsten-17β-ol-3-one.
8. 2-formyl-Δ¹-androsten-17β-ol-3-one-17-acetate.
9. 2 - formyl - 19-nor-Δ¹-androsten-17β-ol-3-one-17-acetate.
10. 2-formyl-17α-methyl-Δ¹-androsten-17β-ol-3-one-17-acetate.
11. 2-formyl-17α-methyl-19-nor-Δ¹-androsten-17β-ol-3-one-17-acetate.
12. A compound of the following formula:

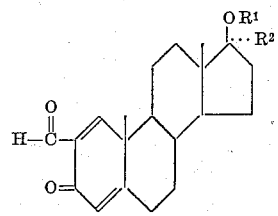

wherein R¹ is selected from the group consisting of hydrogen and a hydrocarbon carboxylic acyl group of less than 12 carbon atoms; and R² is selected from the group consisting of hydrogen, an alkyl, an alkenyl, and an alkinyl group each containing less than 8 carbon atoms.

13. 2-formyl-Δ¹,⁴-androstadien-17β-ol-3-one.
14. 2-formyl - 17α - methyl-Δ¹,⁴-androstadien-17β-ol-3-one.
15. 2-formyl-Δ¹,⁴-androstadien-17β-ol-3-one-17-acetate.
16. 2-formyl - 17α - methyl-Δ¹,⁴-androstadien-17β-ol-3-17-caproate.

17. A process for the production of a compound of the following formula:

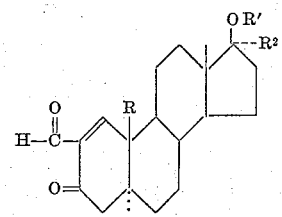

where R is selected from the group consisting of hydrogen and methyl; R¹ is selected from the group consisting of hydrogen and a hydrocarbon carboxylic acyl group of less than 12 carbon atoms; and R² is selected from the group consisting of hyrogen, an alkyl, an alkenyl, and an alkinyl group; each containing less than 8 carbon atoms, which comprises treating the corresponding 2 - hydroxymethylene-androstan-17β-ol-3-one derivative with the dehydrogenating agent 2,3-dichloro-5,6-dicyano-p-benzoquionone in an inert solvent.

18. A process for the production of a compound of the following formula:

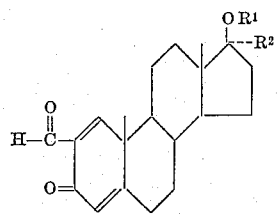

wherein R¹ is selected from the group consisting of hydrogen and a hydrocarbon carboxylic acyl group of less than 12 carbon atoms; and R² is selected from the group consisting of hydrogen, an alkyl, an alkenyl, and an alkinyl group each containing less than 8 carbon atoms, which comprises treating the corresponding 2-hydroxymethylenetestosterone derivative with the dehydrogenating agent 2,3-dichloro-5,6-dicyano-p-benzoquinone in an inert solvent.

References Cited in the file of this patent
UNITED STATES PATENTS 2,281,622 Ruzicka _____ May 5, 1942
2,837,464 Nobile _____ June 3, 1958

FOREIGN PATENTS 854,343 Great Britain _____ Nov. 16, 1960

OTHER REFERENCES

B.D.H. Ltd., Derwent Belgian Report No. 55A, June 30, 1959, page A-7.